(12) United States Patent
Impola et al.

(10) Patent No.: US 11,550,058 B2
(45) Date of Patent: Jan. 10, 2023

(54) PERCEPTION SYSTEM THREE LIDAR COVERAGE

(71) Applicant: Caterpillar Paving Products Inc., Brooklyn Park, MN (US)

(72) Inventors: Todd A. Impola, Minnetonka, MN (US); Timothy M. O'Donnell, Long Lake, MN (US); John L. Marsolek, Watertown, MN (US); Jacob J. McAlpine, Otsego, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 461 days.

(21) Appl. No.: 16/846,077

(22) Filed: Apr. 10, 2020

(65) Prior Publication Data

US 2021/0318440 A1 Oct. 14, 2021

(51) Int. Cl.
*G01S 17/89* (2020.01)
*G05D 1/00* (2006.01)
*G01S 7/481* (2006.01)
*E01C 21/00* (2006.01)
*E01C 19/26* (2006.01)
*B60W 60/00* (2020.01)

(52) U.S. Cl.
CPC .............. *G01S 17/89* (2013.01); *E01C 19/26* (2013.01); *E01C 21/00* (2013.01); *G01S 7/4811* (2013.01); *G05D 1/0088* (2013.01); *B60W 60/001* (2020.02); *B60W 2420/52* (2013.01); *G05D 2201/0202* (2013.01)

(58) Field of Classification Search
CPC ...... G01S 17/87; G01S 7/4813; G01S 7/4811; G01S 17/89; G01S 17/931; E01C 21/00; E01C 19/004; E01C 19/26; G05D 1/0088; G05D 2201/02; B60W 2420/52
See application file for complete search history.

(56) References Cited

U.S. PATENT DOCUMENTS

| | | | |
|---|---|---|---|
| 6,847,437 B2 * | 1/2005 | Bruel | G01P 5/26 356/28.5 |
| 7,095,925 B2 * | 8/2006 | Grunnet-Jepson | G01D 5/35396 385/10 |
| 11,125,881 B2 * | 9/2021 | Chen | G01S 17/931 |
| 11,242,098 B2 * | 2/2022 | Patnaik | G01S 13/931 |
| 2006/0210214 A1 * | 9/2006 | Uhlhorn | G02B 6/4249 385/37 |

(Continued)

FOREIGN PATENT DOCUMENTS

| | | |
|---|---|---|
| CN | 105699985 | 6/2016 |
| CN | 109099901 | 12/2018 |
| CN | 110244322 | 9/2019 |

*Primary Examiner* — Tsion B Owens
(74) *Attorney, Agent, or Firm* — Schwegman, Lundberg & Woessner

(57) ABSTRACT

An autonomous articulated soil compactor machine can include: a machine frame; at least one cylindrical roller drum rotatably coupled to the machine frame and rotatable about a drum axis oriented generally transverse to a direction of travel of the compactor machine; a first lidar sensor on a front of the machine; a second lidar sensor on a first side of the machine; and a third lidar sensor on a second side of the machine; wherein the first, second and the third lidar sensors are positioned such that 360 degree lidar coverage is provided around the articulated compactor machine.

20 Claims, 4 Drawing Sheets

(56) References Cited

U.S. PATENT DOCUMENTS

| | | | |
|---|---|---|---|
| 2015/0051828 A1* | 2/2015 | Smith | G01S 5/0294 |
| | | | 701/446 |
| 2017/0168142 A1* | 6/2017 | Kumagai | H04N 5/2257 |
| 2017/0322555 A1 | 11/2017 | Nikolic et al. | |
| 2018/0372875 A1* | 12/2018 | Juelsgaard | G01S 7/4815 |
| 2019/0329764 A1 | 10/2019 | Matsuzaki | |
| 2021/0277610 A1* | 9/2021 | Impola | E01C 19/004 |

* cited by examiner

PERCEPTION SYSTEM THREE LIDAR COVERAGE

TECHNICAL FIELD

This disclosure relates to road construction equipment, and more specifically to a compactor machine with roller drums for traveling over a surface to be compacted.

BACKGROUND

Compactors are machines used to compact initially loose materials, such as asphalt, soil, gravel, and the like, to a densified and more rigid mass or surface. For example, soil compactors are utilized to compact soil at construction sites and on landscaping projects to produce a foundation on which other structures may be built. Most soil compactors include a rotatable roller drum that may be rolled over the surface to compress the material underneath. In addition to utilizing the weight of the roller drum to provide the compressive forces that compact the material, some compactors are configured to also induce a vibratory force to the surface.

Autonomous machines are machines that use a variety of sensors to detect the area around a machine so that the machine can operate without a driver or can be used to assist the driver while they operate the machine.

In an autonomous soil compactor, there is a desire to provide full 360 degree lidar sensor coverage, but such sensors are expensive, so it is also preferable to limit the number of sensors on a machine. Moreover, the articulated nature of the machine makes full sensor coverage challenging. Also, some soil compactors can include a blade, which adds a further challenge.

Patent US 2019/0329764 discusses a work vehicle having a laser radar sensors mounted to the cab of the work vehicle and which is used to detect the obstructions of the vehicle.

SUMMARY

In an example according to this disclosure, an autonomous articulated soil compactor machine can include: a machine frame; at least one cylindrical roller drum rotatably coupled to the machine frame and rotatable about a drum axis oriented generally transverse to a direction of travel of the compactor machine; a first lidar sensor on a front of the machine; a second lidar sensor on a first side of the machine; and a third lidar sensor on a second side of the machine; wherein the first, second and the third lidar sensors are positioned such that 360 degree lidar coverage is provided around the articulated compactor machine.

In another example, an articulated machine can include: a front section of the machine; a back section of the machine, wherein the back end articulates relative to the front end; and a lidar sensor system for the articulated machine, the lidar sensor system including: a first lidar sensor located on a top of a cab roof on a front of the cab roof; a second lidar sensor located on a top of the cab roof on a first side of the machine; and a third lidar sensor located on a top of the cab roof on a second side of the machine; wherein the first, second and the third lidar sensors are positioned such that 360 degree lidar coverage is provided around the articulated machine.

In another example according to the present disclosure, a method of providing 360 degree coverage for a lidar sensing system for an autonomous articulated compactor machine can include: mounting a first lidar sensor on a front of a cab roof of the machine; mounting a second lidar sensor on a first side of the cab roof of the machine; and mounting a third lidar sensor on a second side of the cab roof of the machine; wherein the first, second and the third lidar sensors are positioned such that 360 degree lidar coverage is provided around the articulated compactor machine.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
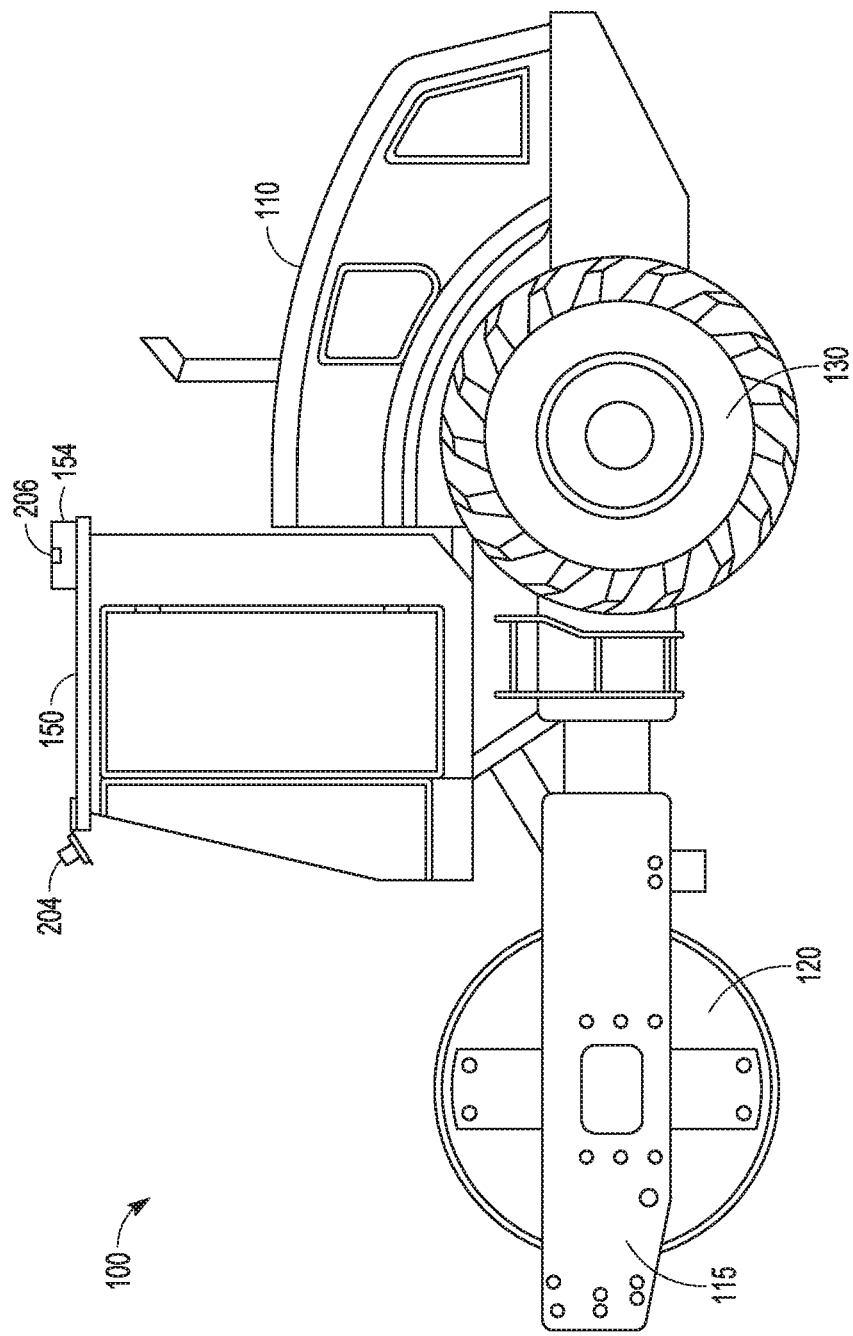
FIG. 1 shows a side view of a compactor machine, in accordance with one embodiment.

FIG. 1 shows a side view of an articulated soil compactor machine 100, in accordance with one embodiment. The compactor machine 100 generally includes a body or machine frame 110 that connects and associates the various physical and structural features that enable the compactor machine 100 to function. These features can include an operator's cab 150 that is mounted on top of the machine frame 110 from which an operator may control and direct operation of the compactor machine 100. Accordingly, a steering feature and similar controls may be located within the operator's cab 150. To propel the compactor machine 100 over a surface, a power system such as an internal combustion engine can also be mounted to the machine frame 110 and can generate power that is converted to physically move the machine.

Compactor machine 100 can include at least a cylindrical roller drum 120 which is rotatable about a drum axis oriented generally transverse to a direction of travel of the compactor machine 100. The roller drums 120 is attached to the machine frame 110 using drum supports 115. The articulated soil compactor machine 100 articulates such that the back section including wheels 130 can articulate relative to the front section including the cylindrical drum 120.

Compactor machine 100 can be an autonomous or semi-autonomous machine. As such, a 360° object detection system can be needed for autonomous vehicles. For example, lidar sensors need to be placed on the machine in specific locations to achieve the required 360° field of view for object detection.

As noted above, due to their limited field of view, four lidar sensors are typically needed to provide full machine coverage. For example, two sensors can cover the front, rear and side, but these two sensors do not move with the articulated part of the machine, so there is a gap in coverage when the machine is at full steer. This causes the need for two additional lidar sensors to cover the steering. In the present system, offering new locations for the lidar sensors can eliminate the need for one of the lidar sensors which would be a big cost saving on hardware for the object detection system.

As will be further detailed below, the lidar sensor coverage of the present system can be provided by a lidar sensor system with three lidar sensors including a first lidar sensor 204 mounted to a front, top of the cab 150, second lidar sensor 206 mounted to one side of the cab 150, and a third lidar sensor 208 (not shown) on the other side of the cab 150. The second and third lidar sensors can be mounted to a cab extension bracket 154.

Figure 2:
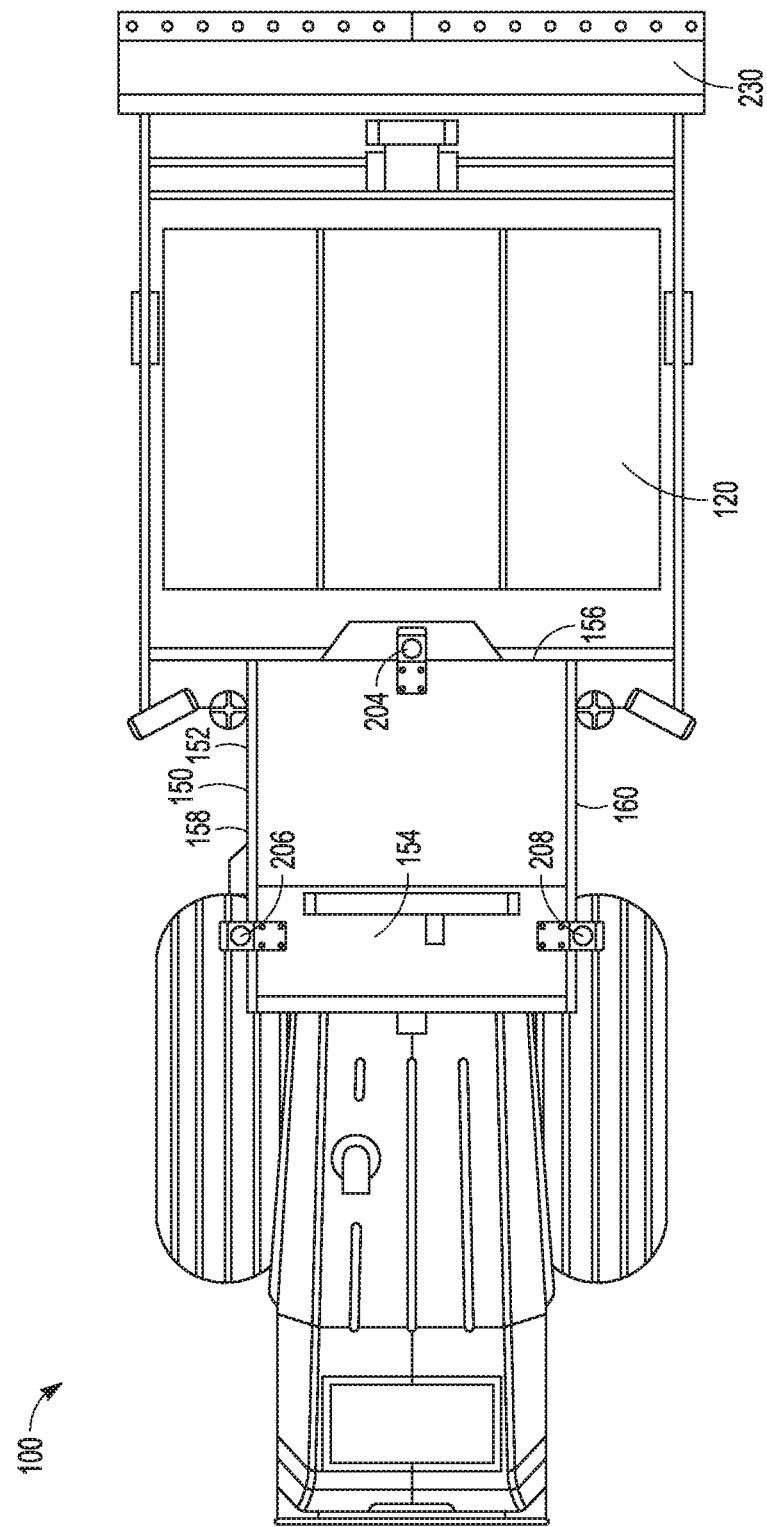
FIG. 2 shows a top view of a compactor machine, in accordance with one embodiment.

FIG. 2 shows a top view of the compactor machine 100, in accordance with one embodiment. Machine 100 further includes a blade 230 mounted to front of the machine in front of the roller drum 120.

Here, the lidar sensor system shows the first lidar sensor 204 on a center, front 156 of a roof 152 of the cab 150 of the machine 100. The second lidar sensor 206 is located on a first side 158 of the roof 152 of the cab 150, and positioned near a back of the roof 152. The third lidar sensor 208 is positioned a second side 160 of the roof 152 of the cab 150, and positioned near a back of the roof 152 opposite of the second lidar sensor 206.

In this example, the second and third sensors 206, 208 are mounted on top of the cab extension bracket 154, which will be discussed below. The first, second and the third lidar sensors 204, 206, 208 are positioned such that 360 degree lidar coverage is provided around the articulated compactor machine 100. The positioning angle and height of the sensors 204-208 allows the lidar sensor system to provide 360 degree coverage even during articulation.

The two side lidar sensors 206, 208 provide coverage of the rear of the machine 100 on each respective side of the machine, and a portion of the front of the machine 100. The front lidar sensor 204 covers the front gap and completes the sensor coverage with some overlap with the side sensors 206, 208. This lidar sensor arrangement also provides full coverage regardless of the articulation angle of the machine.

Figure 3:
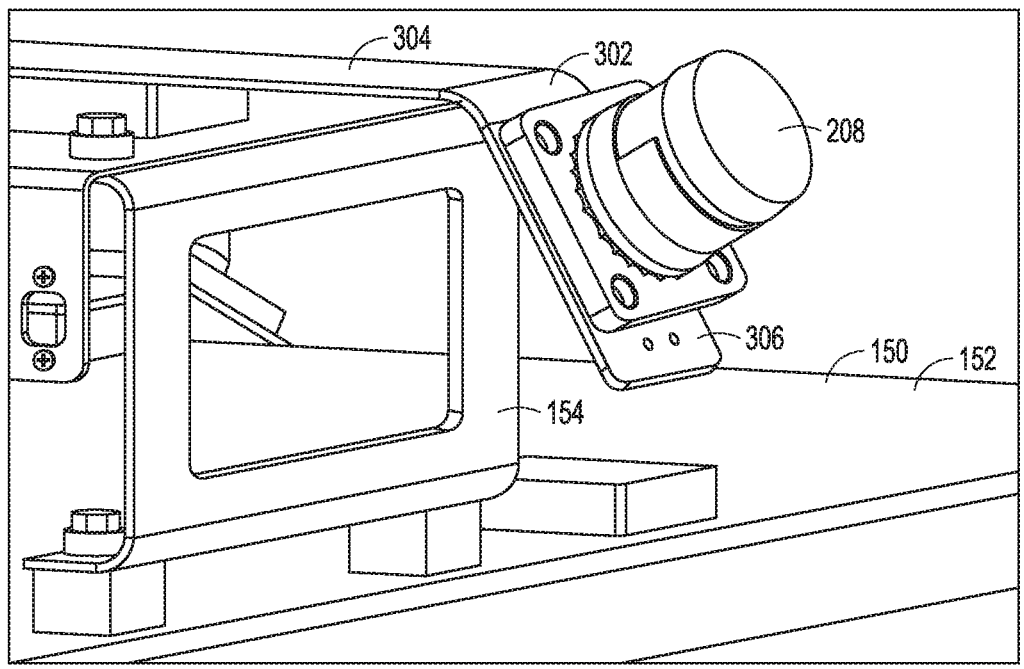
FIG. 3 shows a perspective view of a side mounted lidar sensor, in accordance with one embodiment.

FIG. 3 shows a perspective view of a side mounted lidar sensor 208, in accordance with one embodiment. It is understood that everything discussed about lidar sensor 208 applies also to the lidar sensor 206 mounted on the other side of the machine.

In this example, the second lidar sensor 206 and the third lidar sensor 208 are mounted at an angle relative to a horizontal using a first lidar sensor bracket 302. The first lidar sensor bracket 302 includes a first portion 304 mounted to a top of the cab extension bracket 154 and a second portion 306 angled relative to the first portion 304 and extending over the side of the cab extension bracket 154 and over the side of the cab roof 152. The third lidar sensor 208 is mounted to the second portion 306 of the first lidar sensor bracket 302 and accordingly angles downward from the horizontal. The angle is chosen to provide proper coverage of the lidar sensors 206, 208.

For example, in one embodiment, the second lidar sensor 206 and the third lidar sensor 208 are mounted at a 35 degree to 55 degree angle relative to the horizontal. In one example, the second lidar sensor 206 and the third lidar sensor 208 are mounted at a 45 degree angle relative to the horizontal.

The second and third lidar sensors 206, 208 are mounted on top of the cab extension bracket 154 which then positions the second and third lidar sensors 206, 208 higher than the cab roof 152 so that the lidar sensors 206, 208 are not obstructed by the roof 152 or other parts of the body of the machine 100. In one example, the cab extension bracket 154 has a height such that the cab extension bracket 154 positions the second and third lidar sensors 206, 208 about 6 to 12 inches higher than the cab roof 152. As noted, the second and third lidar sensors 206, 208 are mounted so as to extend over a side edge of the roof 152 of the cab 150. The angle of the sensors 206, 208, the position on the cab roof 152 and the height of mounting on the cab extension bracket 154 all provide for the needed coverage of the sides and back of the machine 100 while avoiding being obstructed by the roof 152 or any parts of the machine 100.

Figure 4:
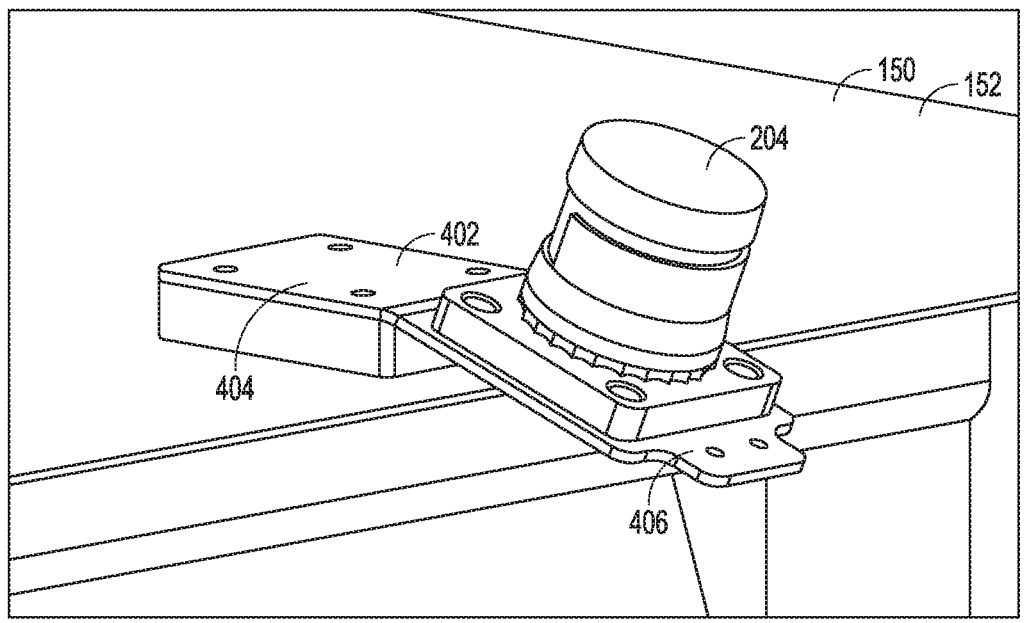
FIG. 4 shows a perspective view of a front mounted lidar sensor, in accordance with one embodiment.

FIG. 4 shows a perspective view of the front mounted lidar sensor 204, in accordance with one embodiment.

In this example, the lidar sensor 204 is mounted to the front, center of the cab roof 152 using a second lidar sensor bracket 402. The second lidar sensor bracket 402 includes a first portion 404 mounted to a top of the cab roof 152 and a second portion 406 angled relative to the first portion 404 and extending over the front of the cab 152. The first lidar sensor 204 is mounted to the second portion 406 of the second lidar sensor bracket 402 and accordingly angles downward from the horizontal. The angle is chosen to provide proper coverage of the lidar sensor 204.

For example, the second lidar sensing bracket 402 can be angled at a 15-25 degree angle. In one embodiment, the second lidar sensing bracket 402 can be angle such that the first lidar sensor 204 is mounted at a 19 degree angle. The positioning and angle allows the first lidar sensor 204 to provide lidar sensor coverage in front of the machine 100 during full articulation and whether or not the machine 100 includes a blade.

Accordingly, referring also back to FIGS. 2-3, it is understood that the first lidar sensor 204, the second lidar sensor 206 and the third lidar sensor 208 are mounted at a downward angle relative to a horizontal, and the second and third lidar sensors 206, 208 are angled more than the first lidar sensor 204. As noted, the second and third lidar sensors 206, 208 are mounted so as to extend over a side edge of the roof 152 of the cab 150. The angle of the sensors 206, 208, and the position on the cab roof 152 and the height of mounting all provide for the needed coverage of the sides and back of the machine 100, while the location and angle of lidar sensor 204 covers the front coverage gap of the side lidar sensors 206, 208 even during articulation.

Figure 5:
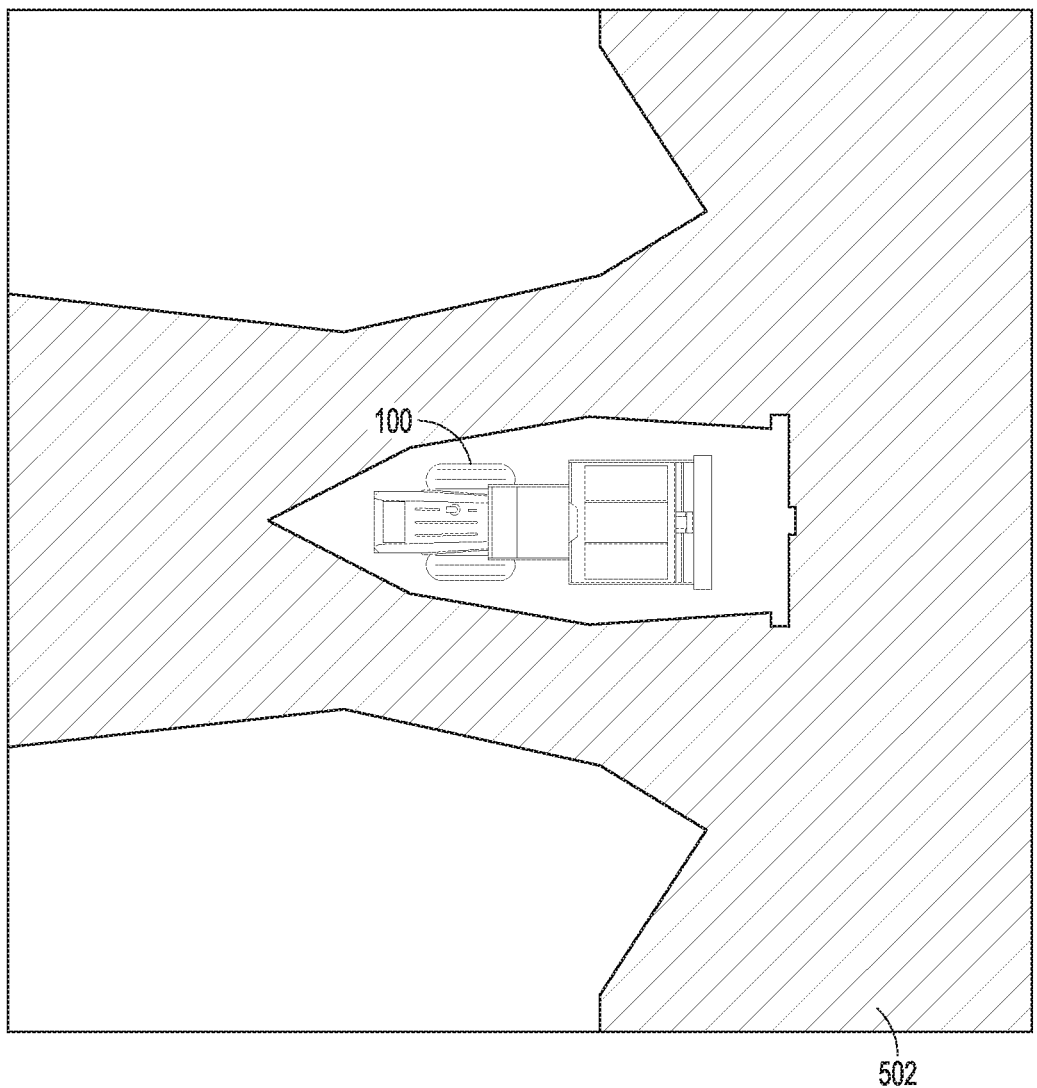
FIG. 5 shows a schematic view of lidar sensor coverage of the present system, in accordance with one embodiment.

FIG. 5 shows a schematic view of lidar sensor coverage of the present system, in accordance with one embodiment where the sensor coverage area 502 shows the 360 degree coverage provided by the system even if the front end were articulated.

INDUSTRIAL APPLICABILITY

The present system is applicable during many situations in road construction. For example, the present system can be used for other articulated machines such as articulated trucks, articulated soil compactors, and articulated asphalt compactors.

For example, and referring to the compactor machine 100 and lidar sensor 204-208 of FIGS. 1-4, a method of providing 360 degree coverage for a lidar sensing system for an autonomous articulated compactor machine 100 will be discussed. The method can include mounting the first lidar sensor 204 on the front 156 of the cab roof 152, mounting the second lidar sensor 206 on the first side 158 of the cab roof 152, and mounting the third lidar sensor 208 on the second side 160 of the cab roof 152. The lidar sensors 204, 206, 208 are positioned such that the first, second and the third lidar sensors 204-208 provide 360 degree lidar coverage around the articulated compactor machine 100.

For example, the lidar sensors 204-208 can be positioned on the cab roof 152 such the first lidar sensor 204, the second lidar sensor 206 and the third lidar sensor 208 are mounted at a downward angle relative to a horizontal. The second and the third lidar sensors 206 and 208 can be mounted at a 35-55 degree angle and the first lidar sensor 204 can be mounted at a 15-25 degree angle. In one example, the second and third lidar sensors 206, 208 are mounted at a 45 degrees angle. In one example, the first lidar sensor 204 is mounted at a 19 degree angle.

Moreover, the first lidar sensor 204 can be mounted on a top surface of the cab roof 152 of the compactor machine 100 at a front center of the cab 150, and the second and third lidar sensors 206, 208 can be mounted on top of the cab roof 152 of the compactor machine 100 towards a back of the cab roof 152. The second and third lidar sensors 206 and 208 can mounted on top of the cab extension bracket 154 that positions the second and third lidar sensors 206, 208 higher than the cab roof 152.

Accordingly, the present system provides a solution to the coverage problem by orienting the lidar positions so that only three lidar sensors are needed, versus four if they were placed in the front, rear and both sides. At a specific height and angle, the side lidar sensors 206, 208 can be used to get coverage in the rear, both sides and some in the front of the machine. In the rear, the two side lidar sensors 206, 208 overlap directly behind the machine 100, offering double coverage in the rear direction of the machine 100. The angle of the side lidar sensors 206, 208 leaves a gap in the front of the machine 100, which is covered by the first lidar sensor 204 in the front of the machine, which spans the missing front portion, and provides double coverage where the first lidar sensor 204 overlaps with the field of view of the side lidar sensors 206, 208. Accordingly, if the exemplary lidar sensors 204, 206, 208 cost about $3000 per unit, the present system drives the cost of the sensors down from $12,000 with four lidar sensors to $9,000 with three lidar sensors.

Various examples are illustrated in the figures and foregoing description. One or more features from one or more of these examples may be combined to form other examples.

The above detailed description is intended to be illustrative, and not restrictive. The scope of the disclosure should, therefore, be determined with references to the appended claims, along with the full scope of equivalents to which such claims are entitled.

What is claimed is:

1. An autonomous articulated soil compactor machine comprising:
   a machine frame;
   at least one cylindrical roller drum rotatably coupled to the machine frame and rotatable about a drum axis oriented generally transverse to a direction of travel of the compactor machine;
   a first lidar sensor on a front of the machine;
   a second lidar sensor on a first side of the machine; and
   a third lidar sensor on a second side of the machine;
   wherein the first, second and the third lidar sensors are positioned such that 360 degree lidar coverage is provided around the articulated compactor machine.

2. The compactor machine of claim 1, wherein the second lidar sensor and the third lidar sensor are mounted at an angle relative to a horizontal.

3. The compactor machine of claim 2, wherein the second lidar sensor and the third lidar sensor are mounted at a 35 degree to 55 degree angle relative to the horizontal.

4. The compactor machine of claim 3, wherein the second lidar sensor and the third lidar sensor are mounted at a 45 degree angle relative to the horizontal.

5. The compactor machine of claim 1, wherein the first lidar sensor, the second lidar sensor and the third lidar sensor are mounted at a downward angle relative to a horizontal, and wherein the second and third lidar sensors are angled more than the first lidar sensor.

6. The compactor machine of claim 5, wherein the second and the third lidar sensors are mounted at a 45 degrees angle and the first lidar sensor is mounted at a 19 degree angle.

7. The compactor machine of claim 1, wherein the first lidar sensor is mounted on a top surface of a cab roof of the compactor machine at a front center of the cab.

8. The compactor machine of claim 1, wherein the second and third lidar sensors are mounted on top of a cab roof of the compactor machine towards a back of the cab roof.

9. The compactor machine of claim 8, wherein the second and third lidar sensors are mounted on top of a cab extension bracket that positions the second and third lidar sensors higher than the cab roof.

10. The compactor machine of claim 9, wherein the cab extension bracket positions the second and third lidar sensors about 6 to 12 inches higher than the cab roof.

11. The compactor machine of claim 10, wherein the second and third lidar sensors are mounted so as to extend over a side edge of the roof of the cab.

12. An articulated machine comprising:
    a front section of the machine;
    a back section of the machine, wherein the back end articulates relative to the front end; and
    a lidar sensor system for the articulated machine, the lidar sensor system including:
    a first lidar sensor located on a top of a cab roof on a front of the cab roof;
    a second lidar sensor located on a top of the cab roof on a first side of the machine; and
    a third lidar sensor located on a top of the cab roof on a second side of the machine;
    wherein the first, second and the third lidar sensors are positioned such that 360 degree lidar coverage is provided around the articulated machine.

13. The articulated machine of claim 12, wherein the second lidar sensor and the third lidar sensor are mounted at 35 degree to 55 degree angle relative to a horizontal.

14. The articulated machine of claim 12, wherein the first lidar sensor, the second lidar sensor and the third lidar sensor are mounted at a downward angle relative to a horizontal, and wherein the second and third lidar sensors are angled more than the first lidar sensor.

15. The articulated machine of claim 14, wherein the second and the third lidar sensors are mounted at a 35-55 degree angle and the first lidar sensor is mounted at a 15-25 degree angle.

16. The articulated machine of claim 12, wherein the first lidar sensor is mounted on a top surface of a cab roof of the compactor machine at a front center of the cab.

17. The compactor machine of claim 16, wherein the second and third lidar sensors are mounted on top of the cab roof of the compactor machine towards a back of the cab roof, wherein the second and third lidar sensors are mounted on top of a cab extension bracket that positions the second and third lidar sensors higher than the cab roof.

18. A method of providing 360 degree coverage for a lidar sensing system for an autonomous articulated compactor machine, the method comprising:

mounting a first lidar sensor on a front of a cab roof of the machine;
mounting a second lidar sensor on a first side of the cab roof of the machine; and
mounting a third lidar sensor on a second side of the cab roof of the machine;
wherein the first, second and the third lidar sensors are positioned such that 360 degree lidar coverage is provided around the articulated compactor machine.

19. The method of claim 18, wherein the first lidar sensor, the second sensor and the third sensor are mounted at a downward angle relative to a horizontal, wherein the second and the third lidar sensors are mounted at a 35-55 degree angle and the first lidar sensor is mounted at a 15-25 degree angle.

20. The method of claim 18, wherein the first lidar sensor is mounted on a top surface of the cab roof of the compactor machine at a front center of the cab, and wherein the second and third lidar sensors are mounted on top of the cab roof of the compactor machine towards a back of the cab roof, wherein the second and third lidar sensors are mounted on top of a cab extension bracket that positions the second and third lidar sensors higher than the cab roof.

\* \* \* \* \*